United States Patent
Petladwala et al.

(10) Patent No.: US 12,019,433 B2
(45) Date of Patent: Jun. 25, 2024

(54) PERIODICITY ANALYSIS APPARATUS, METHOD AND PROGRAM RECORDING MEDIUM

(71) Applicant: NEC Corporation, Tokyo (JP)

(72) Inventors: Murtuza Petladwala, Tokyo (JP); Shingo Takahashi, Tokyo (JP); Shigeru Koumoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 694 days.

(21) Appl. No.: 17/263,734

(22) PCT Filed: Aug. 3, 2018

(86) PCT No.: PCT/JP2018/029170
§ 371 (c)(1),
(2) Date: Jan. 27, 2021

(87) PCT Pub. No.: WO2020/026428
PCT Pub. Date: Feb. 6, 2020

(65) Prior Publication Data
US 2021/0373543 A1     Dec. 2, 2021

(51) Int. Cl.
*G05B 23/02* (2006.01)
*G06N 20/00* (2019.01)

(52) U.S. Cl.
CPC ......... *G05B 23/0221* (2013.01); *G06N 20/00* (2019.01)

(58) Field of Classification Search
CPC ... G05B 23/0221; G05B 23/024; G06N 20/00
See application file for complete search history.

(56) References Cited

U.S. PATENT DOCUMENTS

| | | | | |
|---|---|---|---|---|
| 5,838,561 A | * | 11/1998 | Owen | G05B 19/0428 700/32 |
| 7,933,740 B2 | | 4/2011 | Castelli et al. | |
| 2002/0087495 A1 | | 7/2002 | Wang et al. | |
| 2006/0224356 A1 | * | 10/2006 | Castelli | G06F 18/00 702/176 |
| 2006/0242214 A1 | * | 10/2006 | Tominaga | G06F 18/00 708/200 |

(Continued)

FOREIGN PATENT DOCUMENTS

| | | |
|---|---|---|
| EP | 2410438 A1 | 1/2012 |
| EP | 3258333 A1 | 12/2017 |
| WO | 2018/092073 A1 | 5/2018 |

OTHER PUBLICATIONS

International Search Report for PCT Application No. PCT/JP2018/029170, dated Oct. 30, 2018.

(Continued)

*Primary Examiner* — Manuel A Rivera Vargas
(74) *Attorney, Agent, or Firm* — Sughrue Mion, PLLC

(57) ABSTRACT

Provided an apparatus configured to calculate a periodicity of the time series data using at least one of a periodogram of the time series data and an autocorrelation of the time series data; generate a plurality of subsequences from the time series data, a length of each subsequence set to the periodicity, calculate feature values of the plurality of subsequences, and categorize the plurality of subsequences, based on the features values thereof, into one or more groups; and execute analysis of the time series data, based on the categorization result.

14 Claims, 14 Drawing Sheets

(56) References Cited

U.S. PATENT DOCUMENTS

| 2007/0009406 | A1 | 4/2007 | Hu et al. |
| 2009/0012766 | A1 | 1/2009 | Miyake et al. |
| 2010/0205039 | A1 | 8/2010 | Basak et al. |
| 2017/0132523 | A1* | 5/2017 | Zhang .................... G06N 5/047 |

OTHER PUBLICATIONS

Written opinion for PCT Application No. PCT/JP2018/029170, dated Oct. 30, 2018.
Michail Vlachos, Philip Yu, Vittorio Castelli, "On Periodicity Detection and Structural Periodic Similarity," IBM, Proceedings of the 2005 SIAM International Conference on Data Mining.
Basha, Rawshan and Ameen, Jamal, "Unusual sub-sequence identifications in time series with periodicity", International Journal of Innovative Computing, Information & Control (IJICIC), vol. 3, No. 2, Apr. 2007,pp. 471-480, [Retrieved on Oct. 16, 2018], Internet :<URL:https://www.researchgate.net/publication/228366457>.
Izakian, Hesam and Pedrycz, Witold, "Anomaly Detection in Time Series Data using a Fuzzy C-Means Clustering", 2013 Joint IFSA World Congress and NAFIPS Annual Meeting, Sep. 26, 2013, pp. 1513-1518, <DOI : 10.1109/IFSA-NAFIPS.2013.6608627>.

\* cited by examiner

K columns $$A = \begin{bmatrix} 1 & 0 & \cdots & 0 \\ 0 & 1 & \cdots & 0 \\ 0 & 0 & \cdots & 0 \\ 0 & 0 & & 0 \\ 1 & 0 & \cdots & 0 \\ \vdots & \vdots & & \vdots \\ 0 & 0 & & 1 \end{bmatrix}$$

M rows 3 columns $$A = \begin{bmatrix} 1 & 0 & 0 \\ 1 & 0 & 0 \\ 0 & 0 & 1 \\ 0 & 1 & 0 \\ 1 & 0 & 0 \\ 1 & 0 & 0 \\ 0 & 0 & 1 \\ 0 & 1 & 0 \\ \cdots \\ 0 & 1 & 0 \end{bmatrix}$$

PERIODICITY ANALYSIS APPARATUS, METHOD AND PROGRAM RECORDING MEDIUM

This application is a National Stage Entry of PCT/JP2018/029170 filed on Aug. 3, 2018, the contents of all of which are incorporated herein by reference, in their entirety.

FIELD

The present invention relates to a periodicity analysis apparatus, method, and non-transitory medium.

BACKGROUND

Recent years have witnessed wide spread use of a monitoring system that monitors a state (event) of an object or an entity by analyzing data acquired by one or more sensing devices (such as IoT (Internet of Things)) that measure a signal (s) of the object. Time series data of the measured signal may include information that can be assumed as an event associated with a state or behavior of the object. In the present specification, an event may have the similar meaning of state, behavior, activity, happening, occurrence, or the like, in a physical process, the time series data of which has been acquired.

Analysis and/or monitoring of a periodic change in time series data is useful in fields, such as monitoring periodic activities or events of an electric appliance based on an electric signal waveform acquired therefrom.

In time series data analysis, cluster analysis, i.e., grouping a set of data into a plurality of clusters, has been employed. As an example of the cluster analysis, subsequence time series clustering can be applied to such fields as pattern recognition, outlier detection, anomaly detection, or the like. Given a single time series, subsequences are extracted by a sliding window. More specifically, as illustrated in FIG. 14, given time series data of length N: $X=[x_1, x_2, \ldots, x_N]$ and a window length (size): w with an offset (right shift) being set to s, where $x_i$ represents the i-th sample ($1 =< i =< N$) in the time series data X, w is an integer in the range of 1 to N−1 and s is a divisor of N−w, total (N−w)/s+1 subsequences: $C_1$ to $C_{(N-w)/s+1}$ are extracted from the time series X of length N via the sliding window, which is each time right-shifted by s samples.

Feature value (vector) calculation of each subsequence extracted from the time series data via the sliding window is performed and clustering such as k-means or hierarchical clustering is performed on extracted subsequences, based on the feature values of the subsequences.

Analysis and monitoring of periodic change in time series data is useful in such a field as monitoring periodic activities (behaviors) of an electric appliance, based on an electric signal obtained or measured therefrom.

In an unsupervised learning scheme, selection of a subsequence length has been done, generally, by trial and error approaches, or by a user defined policy that depends on domain knowledge about data. Thus, the selection of a subsequence length is time-consuming. The subsequence clustering with an incorrect window size may bring an incorrect clustering result to provide erroneous information to a subsequent analysis (post-processing analysis), such as event estimation or anomaly detection that uses the clustering result.

PTL (Patent Literature) 1 discloses a method for monitoring sensor data of rotating equipment comprising: processing a sensor data stream consisting of an ordered sequence of feature vectors, each feature vector representing measurements of sensors of the rotating equipment at a certain point in time,
representing the sensor data stream with a set of microclusters, each microcluster defining a subspace,
for each new feature vector of the sensor data stream, updating the set of microclusters by
calculating (1) a correlation distance measure between the new feature vector and each microcluster, and
assigning (3) the new feature vector to a microcluster with a smallest value for the correlation distance measure if the value is below a range parameter and updating (4) the microcluster based on the new feature vector, or
creating (5) a new microcluster based on the new feature vector if all values for the correlation distance measure are above the range parameter for forecasting.

PTL 2 discloses a tool for effectively performing a meaningful analysis of a system state by using a specific index. A part having unusual behavior is extracted as an event timing from time-series data on an index derived from a system. An event descriptor describing the state of the system by using the event timing is generated. A method for generating the event descriptor associated with at least one system includes: a step (A) for acquiring time-series data on at least one index derived from at least one system; a step (B) for providing at least one peculiar behavior associated with the index; and a step (C) for extracting a part having the peculiar behavior as an event timing in the time-series data and generating an event descriptor described by the event timing.

In PTL 3 and NPTL (Non-Patent Literature) 1 disclose period detection by considering the information in both autocorrelation and periodogram.

PTL 1 EP3258333A1
PTL 2 US2009/0012766A1
PTL 3 U.S. Pat. No. 7,933,740 B2
NPTL 1 "On Periodicity Detection and Structural Periodic Similarity," Michail Vlachos, Philip Yu, Vittorio Castelli, IBM, Proceedings of the 2005 SIAM International Conference on Data Mining As described above, selecting a suitable subsequence length in subsequence time series clustering is a time consuming process. An inappropriate selection of a length of subsequences that are extracted from time series data, may provide an incorrect clustering result. This may result in deterioration of an estimation accuracy in post-processing, such as outlier detection, anomaly detection, etc., which executes analysis of time series data using the clustering result.

Accordingly, it is an object of the present invention to provide an apparatus, a method, a program recording medium, each enabling to select an appropriate length of subsequences, extracted from time series data for categorization, such as subsequence clustering/classification.

According to an aspect of the present invention, there is provided a periodicity analysis apparatus comprising: a storage configured to store time series data; a periodicity calculation unit configured to calculate a periodicity of the time series data; a subsequence categorizing unit configured to generate a plurality of subsequences, from the time series data, a length of each subsequence set to the periodicity, calculate feature values of the plurality of subsequences, and categorize the plurality of subsequences, based on the features values thereof, into one or more groups; and a post-processing unit configured to execute analysis of the time series data, based on the categorization result, wherein the periodicity calculation unit calculates the periodicity of the times series data, using at least one of a periodogram of the time series data and an autocorrelation of the time series data.

According to an aspect of the present invention, there is provided a periodicity analysis method comprising:

calculating a periodicity of the time series data;

extracting a plurality of subsequences, each having a length set to the periodicity, from the time series data;

categorizing the plurality of subsequence, based on feature values of the plurality of subsequences, into one or more groups; and executing post-processing of the time series data, based on the categorization result, wherein the calculating a periodicity of the times series data includes calculating the periodicity of the times series data, using at least one of a periodogram of the time series data and an autocorrelation of the time series data.

According to an aspect of the present invention, there is provided a computer-readable recording medium storing therein a program causing a computer to execute processing comprising:

calculating a periodicity of the time series data;

extracting a plurality of subsequences, each having a length set to the periodicity, from the time series data;

categorizing the plurality of subsequence, based on feature values of the plurality of subsequences, into one or more groups; and executing post-processing of the time series data, based on the categorization result, wherein the calculating a periodicity of the times series data processing includes calculating the periodicity of the times series data, using at least one of a periodogram of the time series data and an autocorrelation of the time series data.

The recording medium may be a non-transitory computer-readable recording medium such as a semiconductor memory (Random Access Memory (RAM), Read Only Memory (ROM), Electrically Erasable and Programmable Read Only Memory (EEPROM), flash memory, or the like), Hard Disk Drive (HDD), Solid State Drive (SSD), Compact Disc, Digital Versatile Disc, and so forth).

According to the present invention, it is made possible to select an appropriate length of subsequences, extracted from time series data for categorization, such as subsequence clustering/classification.

BRIEF DESCRIPTION OF DRAWINGS

FIG. 6 is

DETAILED DESCRIPTION

Figure 1:
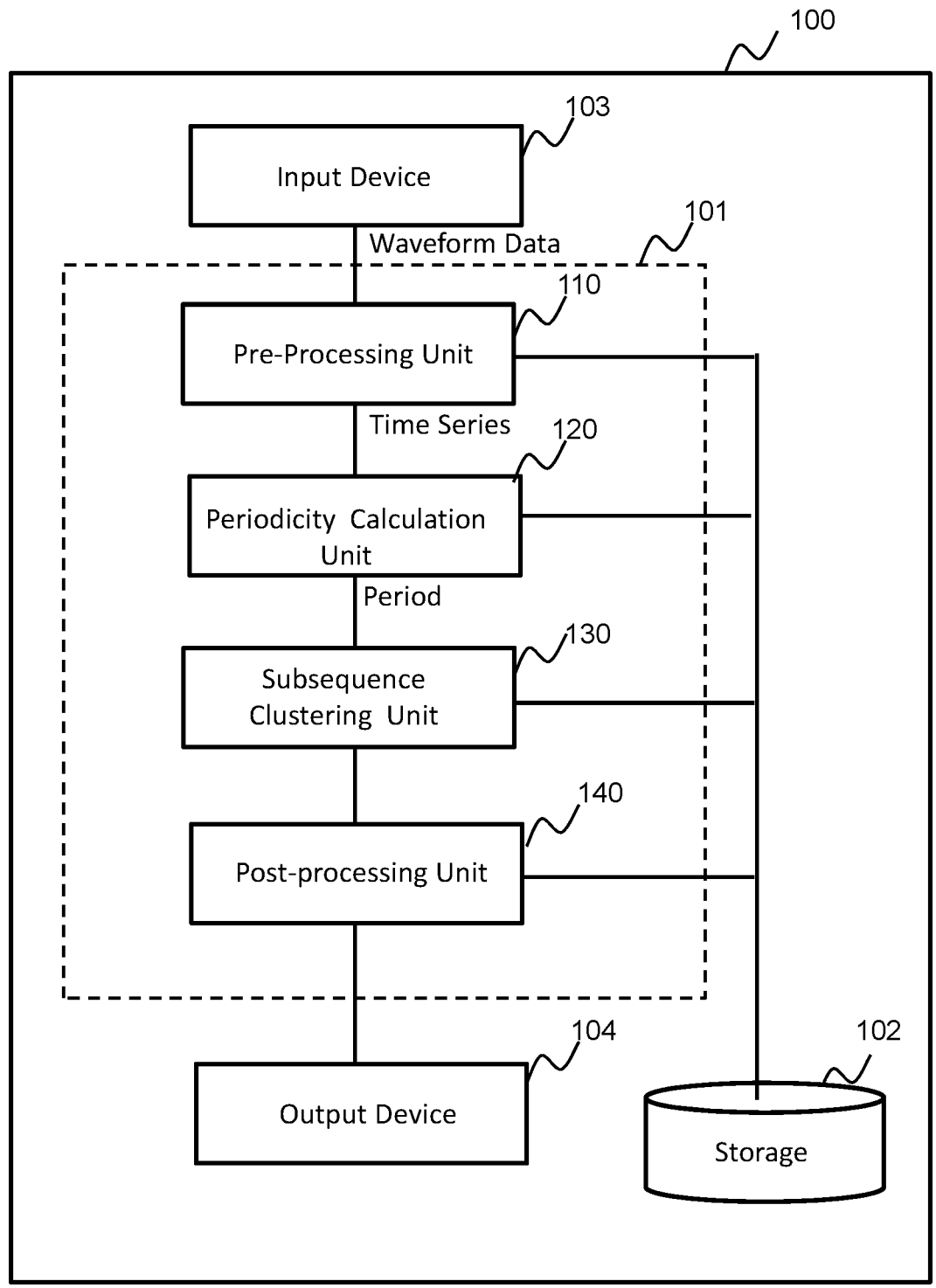
FIG. 1 is a diagram illustrating an arrangement of a first example embodiment.

The following described example embodiments. FIG. 1 is a diagram illustrating an arrangement of a periodicity analysis apparatus of a first example embodiment. Referring to FIG. 1, the periodicity analysis apparatus 100 includes a processing unit 101, a storage unit 102, an input device 103, and an output device 104.

The processing unit 101 includes a pre-processing unit 110, a periodicity calculation unit 120, a subsequence clustering unit 130, and a post-processing unit 140. In FIG. 1, units 110-140 are integrated in the processing unit 101.

The input device 103 may include a communication unit (not shown) to communicate with a measurement device such as current sensor (not shown) or power sensor (not shown). In this case, the input device 103 is configured to receive, from the sensor, a waveform of an electric appliance to be monitored, such as consumption current or power consumption.

The pre-processing unit 110 receives waveform data from the input device 103, performs preprocessing of the waveform data, if necessary, to generate time series data, and stores the pre-processed time series data in the storage unit 102. The pre-processing unit 110 may calculate, for example, RMS (root mean square) of an instantaneous current waveform or an instantaneous power waveform received by the input device 103. In a case where the measurement device is enabled to provide RMS data of current or power and the input device 103 is configured to receive RMS time series data, the RMS calculation by the pre-processing unit 110 can be omitted. A time period for the RMS calculation may be, for example, one or multiple of AC power supply cycle(s), though not limited thereto. The pre-processing unit 110 may as a matter of course perform pre-processing other than RMS calculation, such as peak value detection, average value calculation, filtering or the like.

The periodicity calculation unit 120 reads out the time series data from the storage unit 102 and finds a periodicity in the time series data. The periodicity calculation unit 120 may calculate a periodicity of the times series data, using a periodogram and an autocorrelation of the time series data. Further details of the periodicity calculation unit 120 will be described later with reference to the drawings.

The subsequence clustering unit 130 performs subsequence time series clustering. More specifically, the subsequence clustering unit 130 extracts subsequences from the time series data via a sliding window, a window size (length) w of which is set to the periodicity.

The subsequence clustering unit 130 calculates, as a feature value of each subsequence, for example, power spectrum such as periodogram feature, autocorrelation, or a statistical feature value (mean, standard deviation, sum, median, squared sum) or the like. The subsequence clustering unit 130 may well calculate a feature vector including elements of a plurality kinds of feature values.

The subsequence clustering unit 130 may apply unsupervised clustering on feature values or feature vectors of the subsequences, such as a k-means clustering algorithm, in which the number of clusters needs to be pre-specified, that is, the number of clusters is to be specified before the algorithm is applied, to categorize the subsequences based on the feature values (vectors) of the subsequences into the pre-specified number of clusters (groups). The subsequence clustering unit 130 may, as a matter of course, use a hierarchical clustering in which there is no need to pre-specify the number of clusters.

The post-processing unit 140 receives the clustering result output from the subsequence clustering unit 130. The clustering result may include information on the subsequence number in association with the cluster number into which the subsequence is categorized.

The post-processing unit 140 performs analysis of the time series data, such as outlier detection, anomaly detection, missing event detection, or the like, based on the clustering result. For example, the post-processing unit 140 can detect, as an outlier, any subsequence which does not belong to any cluster. That is, if a feature value of a subsequence is far from any of cluster centroids, it may be decided to be an outlier. Alternatively, the post-processing unit 140 may build a two-class classifier for normal and anomalous data for outlier detection. Alternatively, the post-processing unit 140 may be configured so as to find a periodicity of the subsequences belonging to a same cluster based on an occurrence order of the subsequences belonging to the same cluster and identify the subsequence, as anomaly, occurrence of which violates the periodicity of the subsequences belonging to the same cluster. In this case, the post-processing unit 140 may perform missing event detection by identifying the subsequence, occurrence of which is expected according to the periodicity of the subsequences belonging to one cluster, but clustering of which into the one group is not performed.

The output device 104 outputs a post-processing result, such as outlier, anomaly, event missing, or the like detected by the post-processing unit 140. The output device 104 may include a display unit to output the post-processing result or a communication unit to transmit the post-processing result via a network to a terminal of a maintenance personnel.

Figure 2:
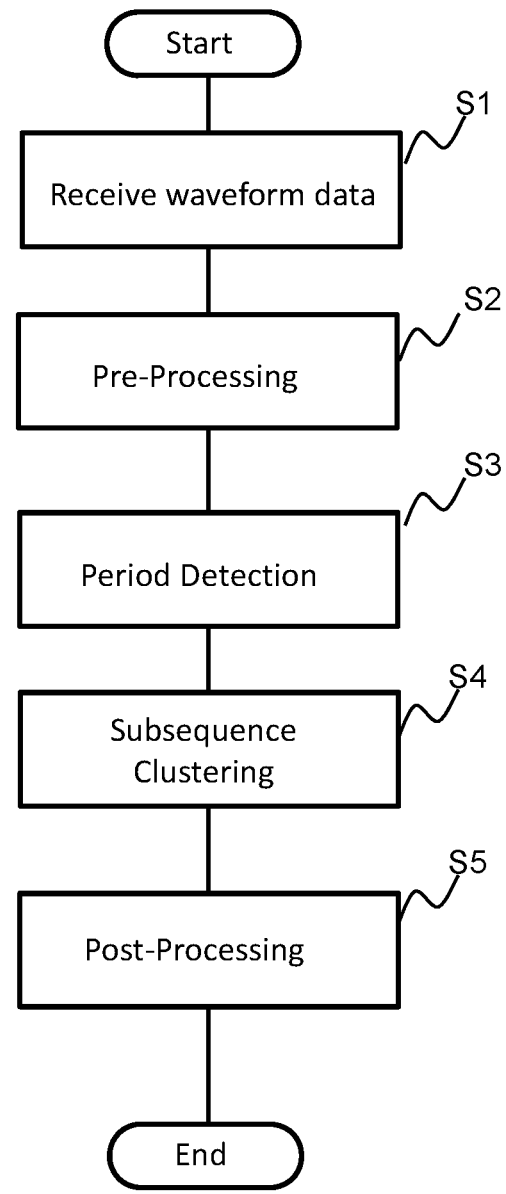
FIG. 2 is a flow chart illustrating an operation of the first example embodiment.

FIG. 2 is a flowchart illustrating an operation of the example embodiment. Referring to FIG. 2, the periodicity analysis apparatus 100 receives waveform data from a measurement unit that measures a signal of an electric appliance such as a consumption current or power (Step S1).

The periodicity analysis apparatus 100 performs pre-processing of the waveform data to generate time series data (Step S2).

The periodicity analysis apparatus 100 performs periodicity detection of time series data (Step S3).

The periodicity analysis apparatus 100 performs subsequence time series clustering (Step S4).

The periodicity analysis apparatus 100 performs post-processing based on the result of the subsequence time series clustering (Step S5).

In the present example embodiment, the periodicity calculation unit 120 can use any algorithm such as a power spectrum analysis to find a periodicity of the time series data. The following describes an example of the periodicity calculation unit 120.

Assuming that time series data consist of N samples indexed in time order: x(0), x(T), x(2*T), ..., x((N−1)*T), where T is a sampling time interval. When x(n*T) is denoted by x(n), DFT (Discrete Fourier Transform) of the time series data is given as follows:

$$X(k) = \sum_{n=0}^{N-1} x(n) e^{-\frac{j2\pi kn}{N}}, k = 0, 1, ..., N-1 \qquad (1)$$

where X(k) is a complex DFT coefficient at a frequency k/(T*N).

IDFT (Inverse DFT) is given by $$x(n) = \frac{1}{N} \sum_{n=0}^{N-1} X(k) e^{\frac{j2\pi kn}{N}}, k = 0, 1, ..., N-1 \qquad (2)$$

The periodogram $I(f_k)$ is given by the square of the DFT amplitude spectrum.

$$I(f_k) = \frac{1}{N} \|X(k)\|^2 \qquad (3)$$

where $f_k$ is k/(N*T).

To find a periodicity, a frequency bin at which the maximum power spectral density (maximum peak) resides in the periodogram is selected. When the maximum power spectral density (maximum peak) is found to occur at a k-th DFT bin (i.e., at frequency: $f_k$=k/(N*T)), this bin corresponds to a period [N*T/k, N*T/(k−1)] in a time domain. The resolution of the periodogram for a longer period (for a smaller value of k) becomes course. When the time series data has a frequency, which is not integer multiple of the DFT bin 1/(N*T), the power spectrum of this frequency is dispersed over the entire spectrum.

The periodicity in the time series data can be estimated by calculating a circular autocorrelation function (ACF) of the time series data. ACF for lag l is given by $$ACF(l) = \sum_{n=0}^{N-1} x(n) \cdot x(n+l) \qquad (4)$$

The ACF can be calculated by the IDFT of the power spectrum $\|X(k)\|^2$.

Figure 3:
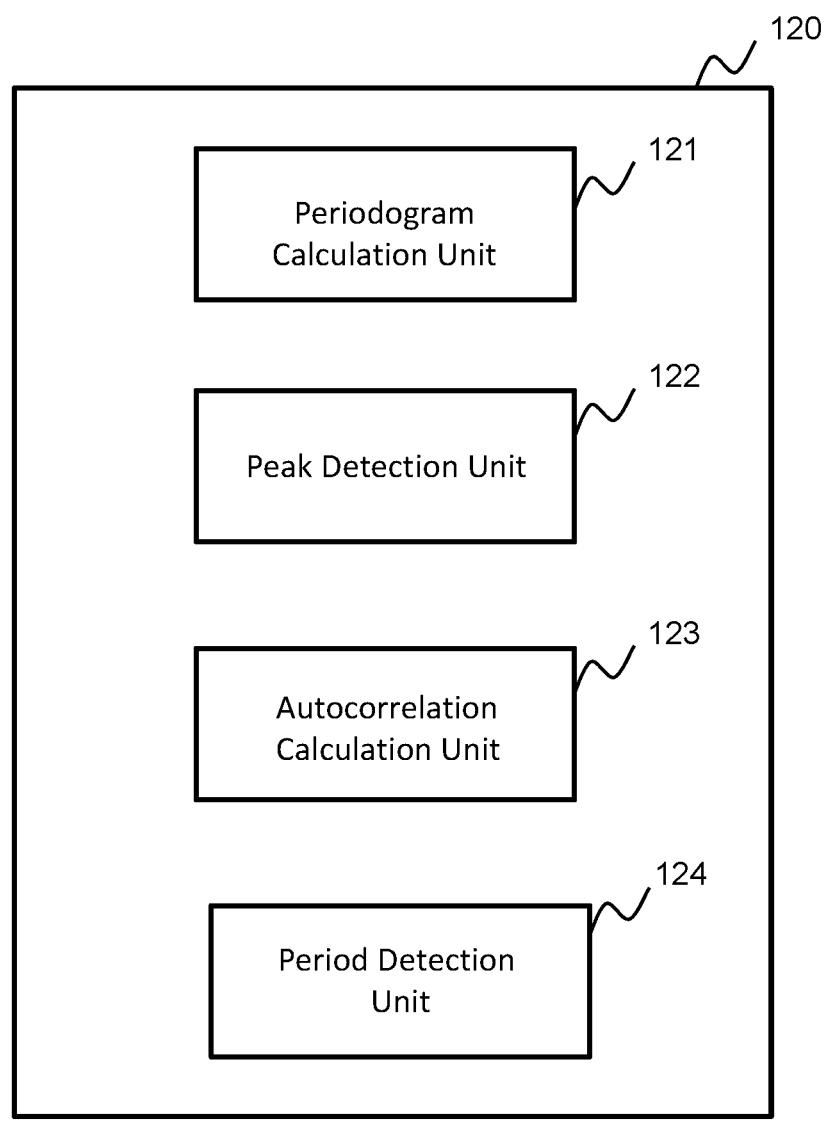
FIG. 3 is a diagram illustrating an arrangement of a periodicity calculation unit of the first example embodiment.

The following describes the combination algorithm of the periodogram and ACF to find a periodicity in the time series data. FIG. 3 illustrates an example of an arrangement of the periodicity calculation unit 120. The periodicity calculation unit 120 includes a periodogram calculation unit 121, a peak detection unit 122, an autocorrelation function calculation unit 123, and a period detection unit 124.

Figure 4:
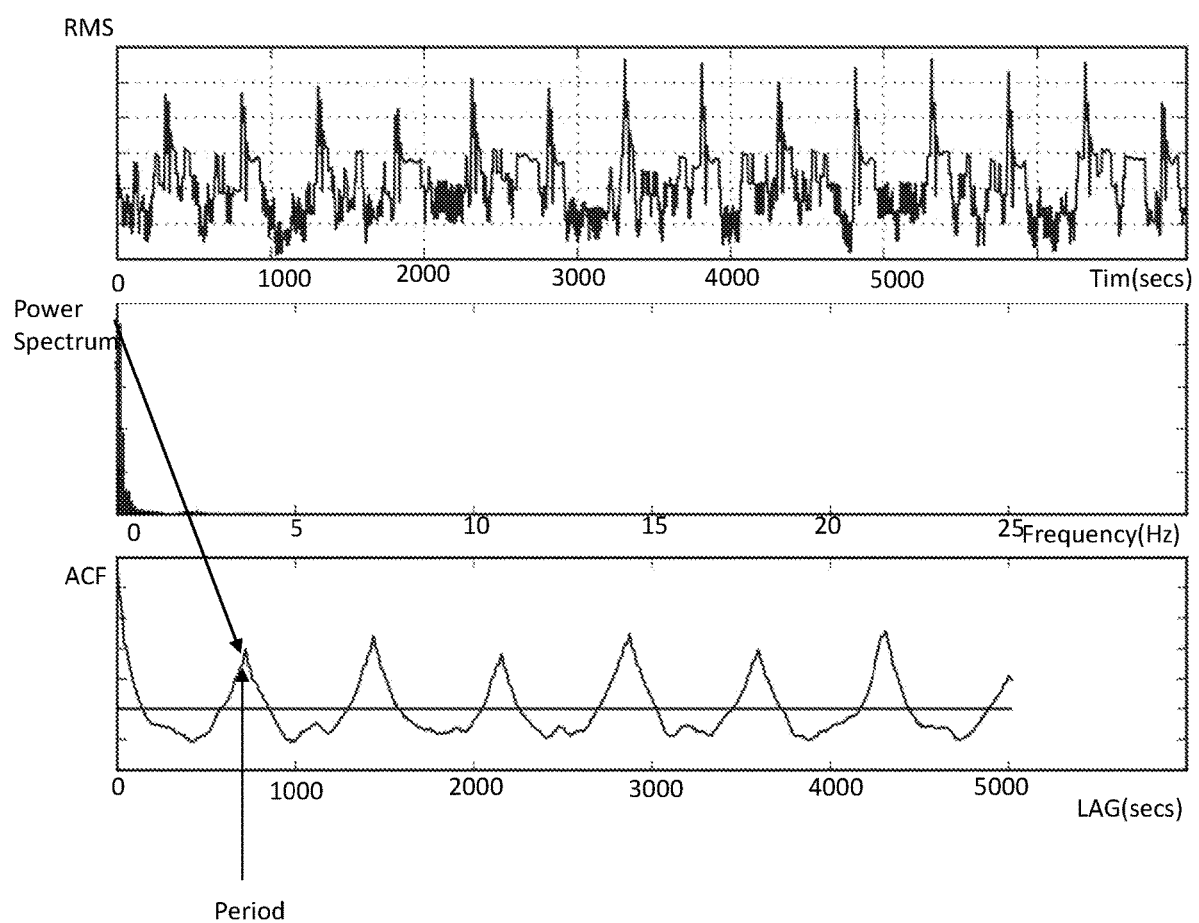
FIG. 4 is a diagram illustrating an example of time series data, periodogram and auto-correlation function (ACF).

FIG. 4 shows the time series data of RMS values, power spectrum of the time series data and the autocorrelation function of the time series data. The first peak in the autocorrelation function is indicated as a period of the RMS time series data by an arrow.

Figure 5:
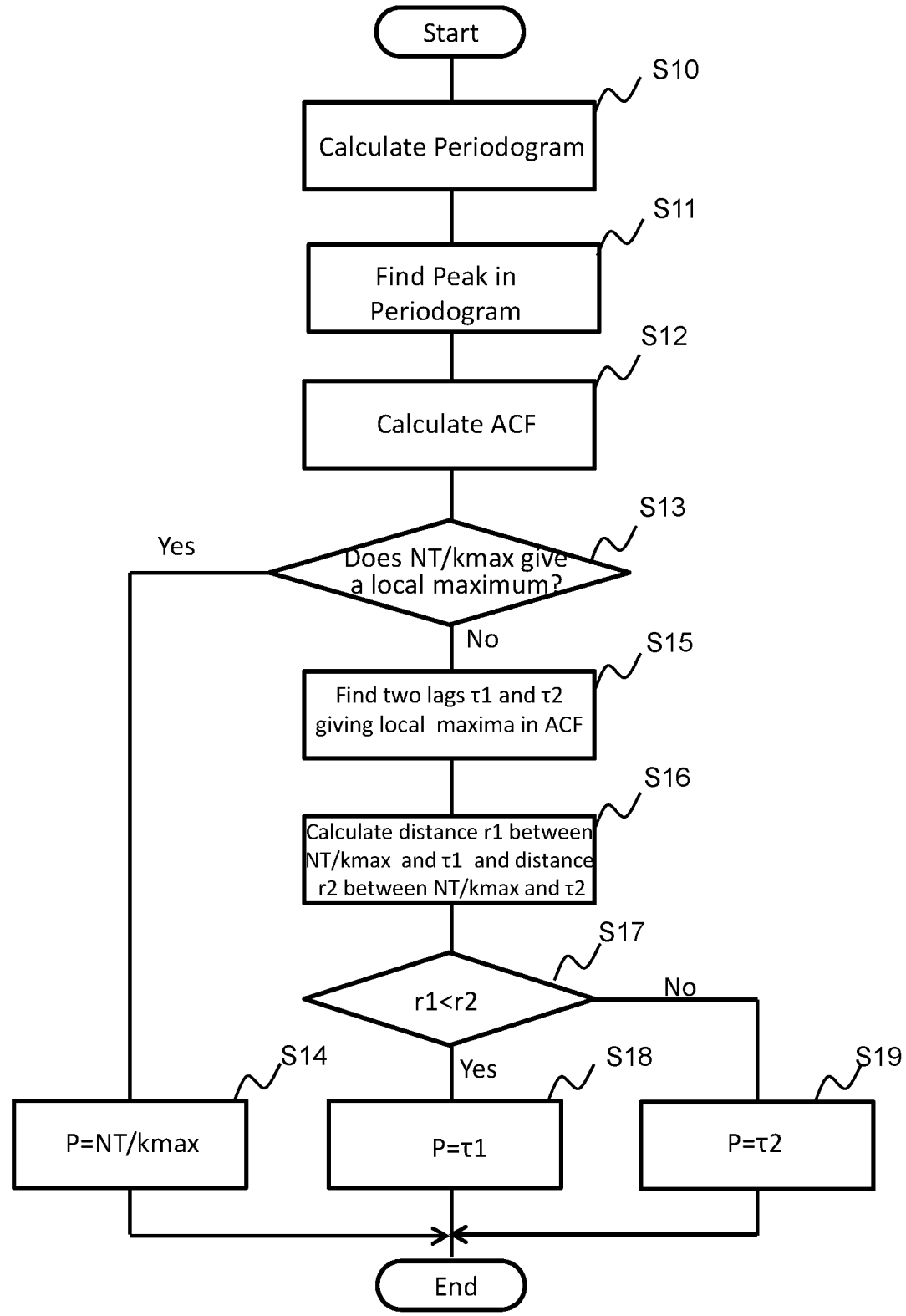
FIG. 5 is a flow chart illustrating an operation of a periodicity calculation unit.

FIG. 5 is a flowchart for explaining the operation of the periodicity calculation unit 120. The periodogram calculation unit 121 calculates a periodogram of the time series data (Step S10).

The peak detection unit 122 detects a DFT bin at which a maximum power spectrum density in the periodogram (Step S11).

$$k_{max} = arg\max_k \frac{1}{N}\|X(k)\|^2, k \in \left\{0, 1, ..., \left\lfloor\frac{N-1}{2}\right\rfloor\right\} \quad (5)$$

where $$\left\lfloor\frac{N-1}{2}\right\rfloor$$

gives the greatest integer less than or equal to $(N-1)/2$.

The peak detection unit 122 obtains a time point $N*T/k_{max}$, the inverse number of which corresponds to the frequency bin at which the power spectrum density in the periodogram takes the maximum value (peak).

The autocorrelation calculation unit 123 calculates an ACF(Step S12).

If a value of ACF at a time point (lag) $N*T/k_{max}$: $ACF(N*T/k_{max})$ takes a peak value (local maximum) (Yes branch of Step S13), the periodicity is set to $N*T/k_{max}$ (Step S14).

There is another case wherein a period is latent in the autocorrelation graph because it has a lower amplitude but the peak corresponding to the period is very obvious (takes a maximum peak) in the periodogram, as described in NPTL 1. In this case, the selection of $N*T/k_{max}$ as a periodicity, which is derived from the periodogram, is effective.

If a value of ACF at a lag of $N*T/k_{max}$: $ACF(N*T/k_{max})$ is not a peak value (local maximum) (No branch of Step S13), the period detection unit 124 finds two local maxima which occur at time points (lags) $\tau 1$ and $\tau 2$, with $N*T/k_{max}$ sandwiched between $\tau 1$ and $\tau 2$, in the ACF (Step S15). The time points (lags) $\tau 1$ and $\tau 2$ giving two local maxima (also termed as relative local maxima) are both neighboring to $N*T/k_{max}$ which is a time point corresponding to the DFT frequency bin of the maximum peak (maximum power) in the periodogram. The time points (lags) $\tau 1$ and $\tau 2$ giving two local maxima (also termed relative local maxima) are not necessarily on both sides against $N*T/k_{max}$. In finding local maxima in the ACF, the period detection unit 124 may select one or more local maxima which are more than a predetermined threshold level in the ACF. The number of local maxima selected is, as a matter of course, not limited to two.

The period detection unit 124 calculates a distance r1 between $N*T/k_{max}$ and $\tau 1$ and a distance r2 between $N*T/k_{max}$ and $\tau 2$ (Step S16).

$$r1 = \left|\frac{N \cdot T}{k_{max}} - \tau 1\right|, \quad (6)$$
$$r2 = \left|\tau 2 - \frac{N \cdot T}{k_{max}}\right|$$

If r1<=r2, then the periodicity p=$\tau 1$, (Step S18), else p=$\tau 2$ (Step S19).

Figure 6A:
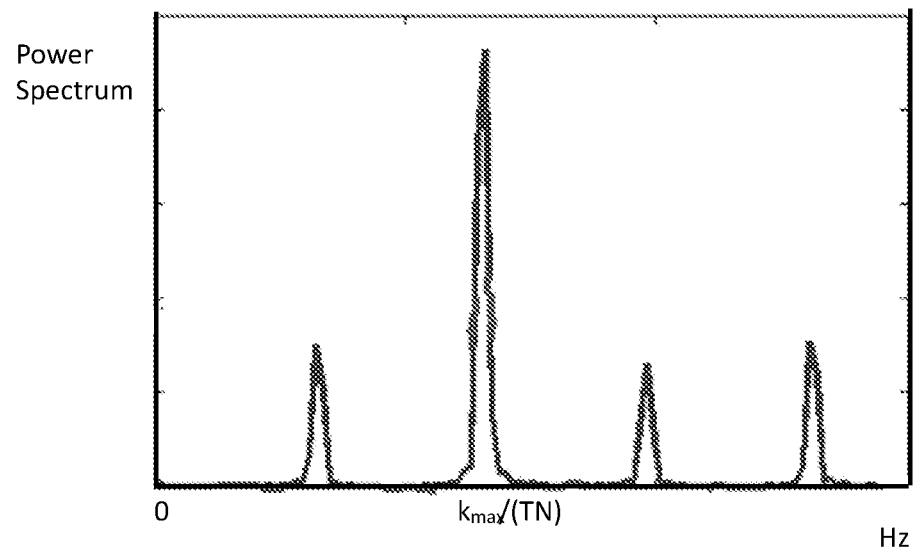
FIGS. 6A and 6B are a diagram illustrating periodogram and auto-correlation function (ACF) for explaining an operation of the periodicity calculation unit, respectively.
Figure 6B:
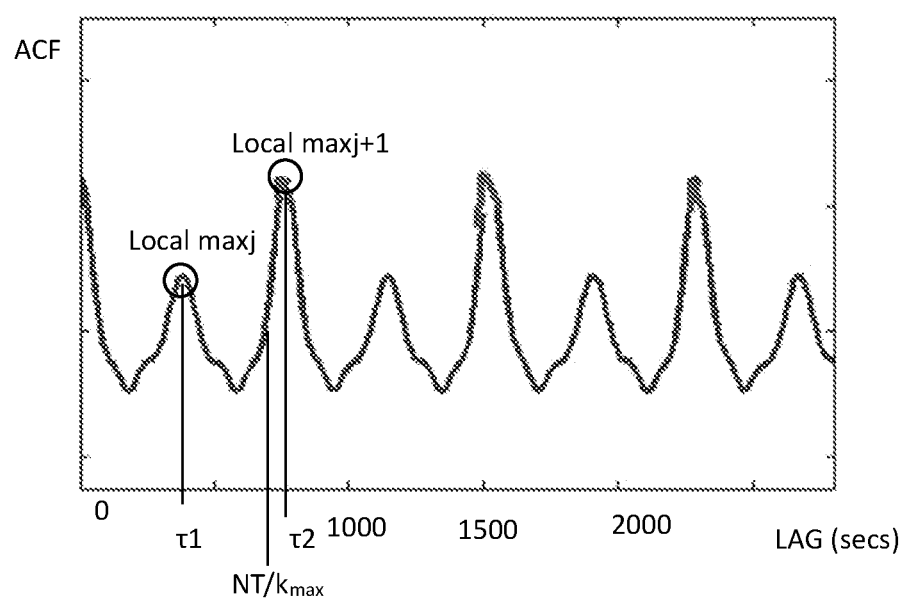

FIGS. 6A and 6B are a diagram for explaining the operation of the period detection unit 124, respectively. In FIG. 6A, the power spectrum has a peak at a DFT frequency bin of $k_{max}/(N*T)$. The period detection unit 124 finds time points (lags) $\tau 1$ and $\tau 2$ giving two separate local maxima (Local $\max_j$ and local $\max_{j+1}$) in the ACF, with the time point: $N*T/k_{max}$ therebetween, as illustrated in FIG. 6B. In an example of FIG. 6B since r1>r2, the periodicity P is set to $\tau 2$.

Figure 7:
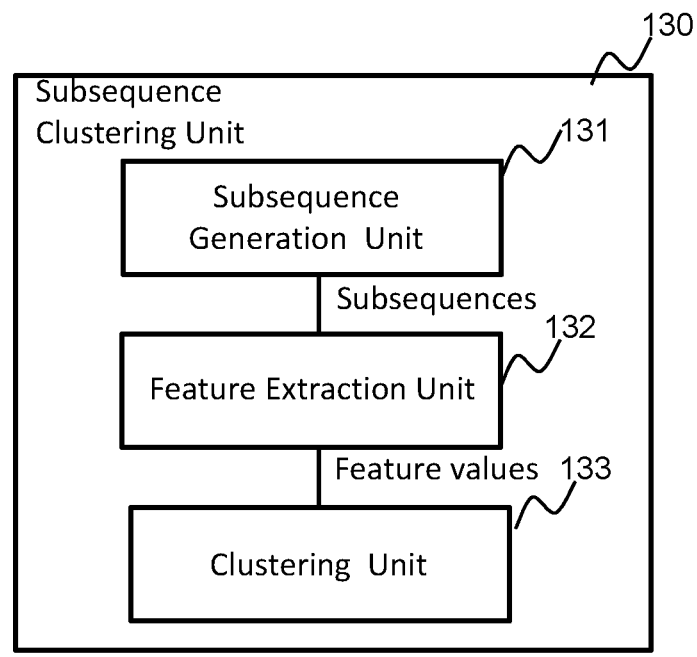
FIG. 7 is a diagram illustrating an arrangement of a subsequence clustering unit of the first example embodiment.

FIG. 7 is a diagram illustrating an arrangement of the subsequence clustering unit 130. Referring to FIG. 7, the subsequence clustering unit 130 includes a subsequence generation unit 131, a feature extraction unit 132 and a clustering unit 133.

Figure 14:
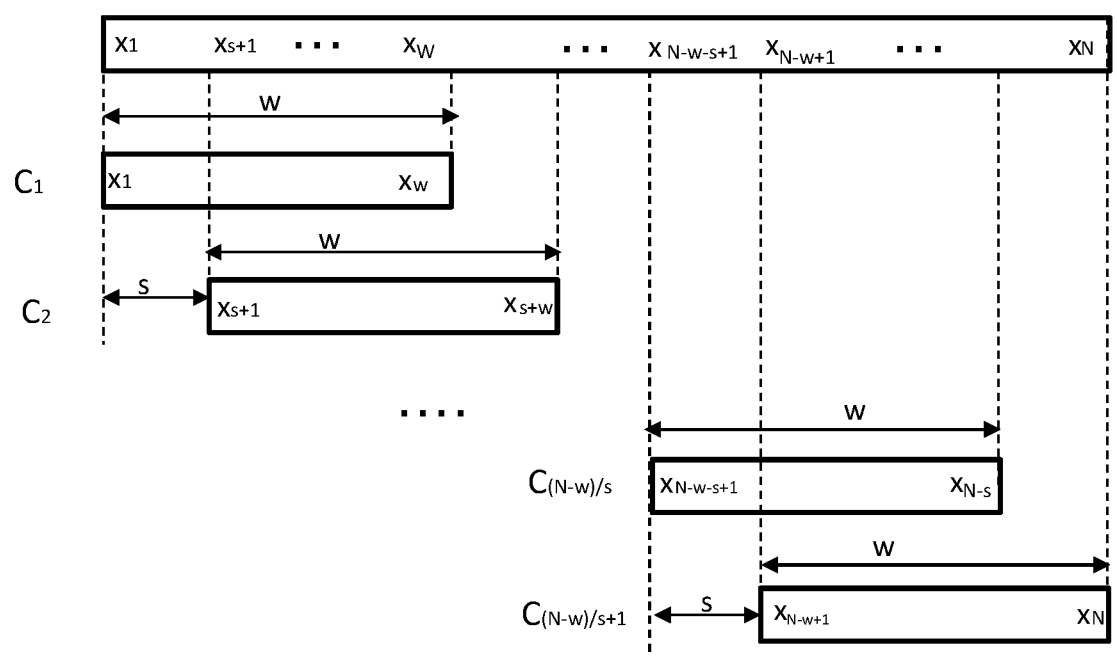
FIG. 14 is a diagram illustrating generation of subsequences via a sliding window.

The subsequence generation unit 131 extracts subsequences from the time series data via a sliding window, a window size w of which is set to the periodicity as described with reference to FIG. 14.

The feature extraction unit 132 calculates, as a feature value of each subsequence, for example, power spectrum such as periodogram feature, autocorrelation, or a statistical feature value (mean, standard deviation, sum, median, squared sum) or the like. The feature extraction unit 132 may well calculate a feature vector including elements of a plurality kinds of feature values.

The clustering unit 133 may apply unsupervised clustering on feature values or feature vectors of the subsequences, such as a k-means clustering algorithm or the like in which the number of clusters to detect is specified in advance to categorize the subsequences based on feature values (vectors) of the subsequences into a predetermined number of clusters (groups). The clustering unit 133 may, as a matter of course, use a hierarchical clustering.

The feature extraction unit 132 may use feature selection which finds a subset of original variables to reduce dimension of data set (feature vector) or use data transformation that transforms data in a high-dimensional space to a space of fewer dimensions by using, for example, principal component analysis (PCA).

Figure 8:
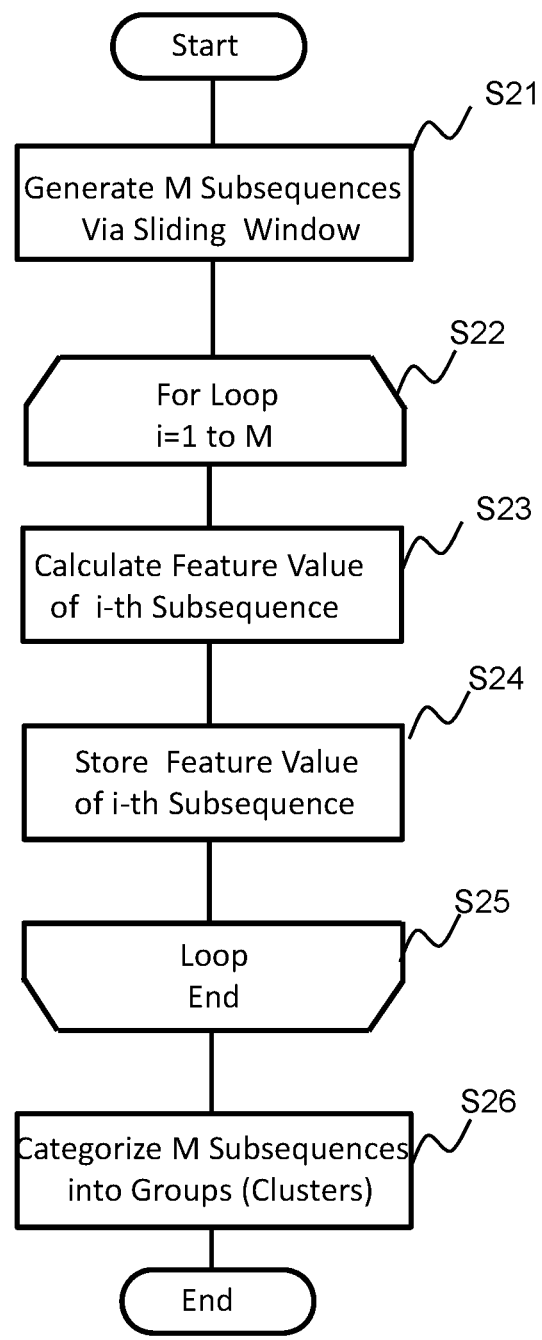
FIG. 8 is a flowchart illustrating operation of the subsequence clustering unit of the first example embodiment.

FIG. 8 is a flow chart illustrating an operation of the subsequence clustering module 130 in FIG. 1. Referring to FIG. 8, the subsequence generation unit 131 generates subsequences from the time series data by using a sliding window, a size of which is set to the periodicity obtained by the periodicity calculation unit 120 (Step S21).

Assuming that M subsequences have been extracted from the time series data by the subsequence generation unit 131, the feature extraction unit 132 calculates a feature values of the M subsequences (Step S22-S25).

The feature extraction unit 132 may calculate, as a feature value of each subsequence, for example, power spectrum such as periodogram feature, autocorrelation, or a statistical feature value (mean, standard deviation, sum, median, squared sum or the like). The feature extraction unit 132 may calculate a feature vector including a plurality of elements constituted by a plurality kinds of feature values.

The clustering unit 133 may use unsupervised clustering, such as a k-means clustering algorithm, or hierarchical clustering to categorize the M subsequences, based on the feature values of the M subsequences, into a predetermined number of groups (clusters) (Step S26).

Figure 9:
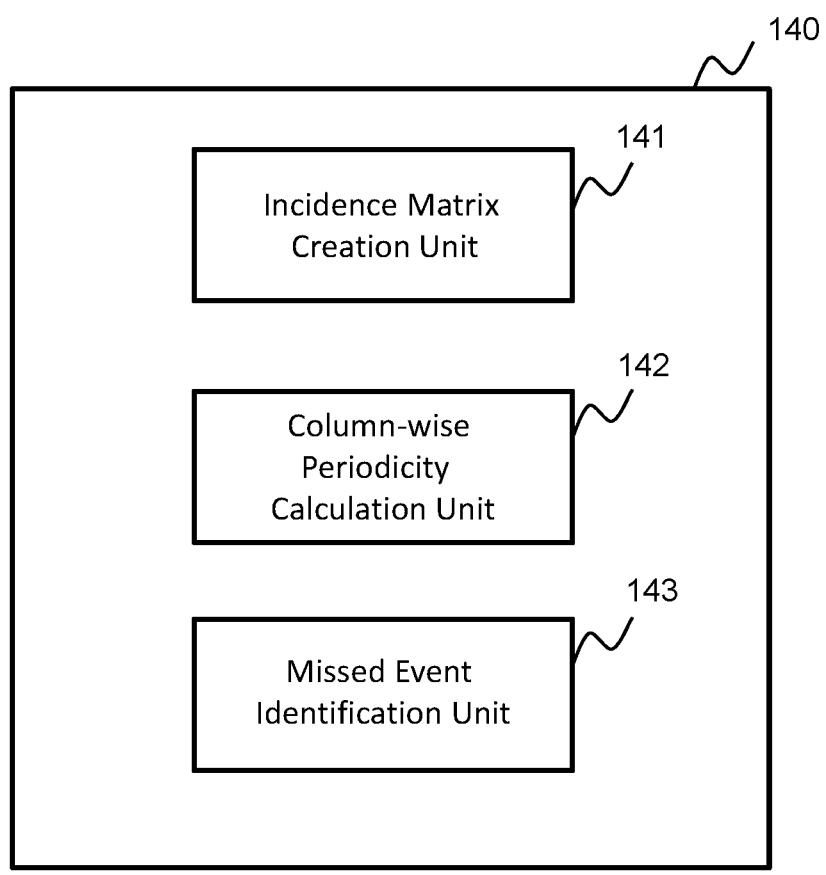
FIG. 9 is a diagram illustrating an example of an arrangement of a post-processing unit of the first example embodiment.

FIG. 9 is a diagram illustrating an example of an arrangement of the post-processing unit 140. Though not limited thereto, in this example, the post-processing unit 140 performs missing-event detection by using periodicity analysis of subsequences belonging to the same group based on the clustering result. The post-processing unit 140 includes an incidence matrix creation unit 141, a column-wise periodicity calculation unit 142, and a missed event identification unit 143.

The incidence matrix creation unit 141 creates, based on the clustering result, an incidence matrix (binary matrix) A.

The clustering result may include information on the subsequence number in association with the cluster number to which the subsequence belongs, for example, (subsequence #1, cluster #1), (subsequence #2, cluster #K), . . . , (subsequence #M, cluster #2). An element a(i,j) of i-th row and j-th column of the incidence matrix A takes a value 1, if i-th subsequence belongs to the cluster #j, otherwise 0, where $1<=i<=M$, and $1<=j<=K$, M is the number of subsequences, K is the number of clusters. In an example of FIG. 14, the number of subsequences is M=(N−w)/s+1, for time series data X=[$x_1, x_2, \ldots, x_N$] with a window length(size) w and an offset s (right shift).

Each cluster, that is, each column of the incidence matrix A may correspond to an event or state.

The column-wise periodicity calculation unit 142 calculates the column-wise periodicity by finding a periodicity of an occurrence of a value 1, from the first row to M-th row in the column. The column-wise periodicity calculation unit 142 stores the column-wise periodicity in a storage unit 102. Let's assume that the calculated periodicity of j-th column of the binary matrix is $P_j$, and a value of an element a(i,j) in the incidence matrix A is 1. If a value of an element a(i+$P_j$,j) (where (i+$P_j$)<=M) is not 1 but 0, the missed event identification unit 143 recognizes a missing of the event and issues an alert. In the incidence matrix A, rows and columns may be interchanged, that is, clusters in rows and subsequences in columns.

Figure 10:
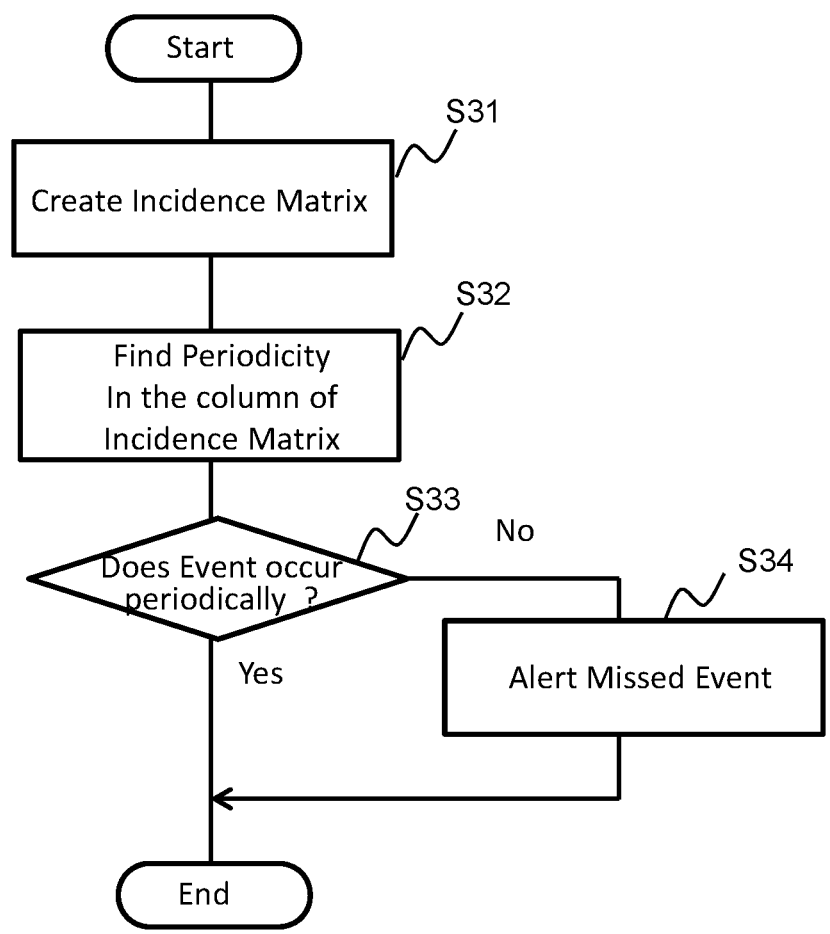
FIG. 10 is a flow chart illustrating an operation of the post-processing unit of the first example embodiment.

FIG. 10 is a flow chart illustrating an operation example of the post-processing unit 140 of FIG. 9. The incidence matrix creation unit 141 creates an incidence matrix (binary matrix) (Step S31).

Each cluster, that is, each column of the incidence matrix A may correspond to an event or state. The post-processing unit 140 calculates a periodicity for each column (column-wise periodicity) in the incidence matrix A.

Figures 11A, 11B, 11C:
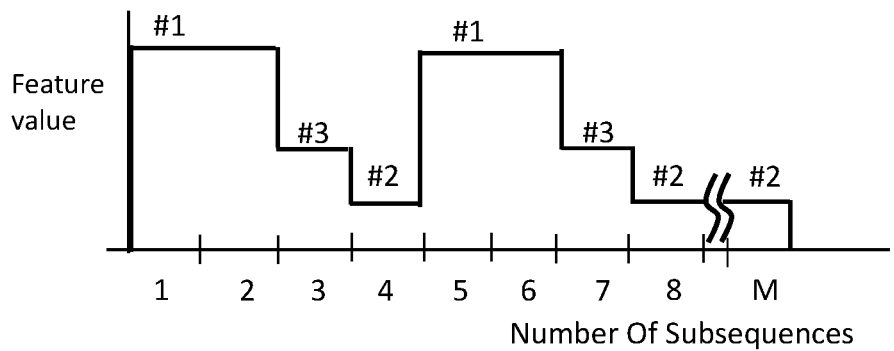
FIGS. 11A-11C illustrate examples of an incidence matrix.

FIG. 11A illustrates an example of the incidence matrix A with M number of rows and K number of columns. Rows and columns of the incidence matrix A corresponds to the subsequence and cluster (group). An element of i-th row and j-th column of the matrix A: a(i,j) takes a value 1, if i-th subsequence is in the cluster j, otherwise 0, where $1<=i<=M$, and $1<=j<=K$, M is the total number of subsequences, K is the total number of clusters. Here, 1st to K-th clusters are regarded to correspond to respective events.

The columns-wise periodicity calculation unit 142 calculates a periodicity of occurrence of the value 1 in each column of the incidence matrix (Step S32). More specifically, the columns-wise periodicity calculation unit 142 scans elements of the incidence matrix A, for example, from 1st row to M-th row in each column to estimate a periodicity of an occurrence of the value 1.

FIG. 11B illustrates an example of the incidence matrix A of 3 columns. In FIG. 11B, the column-wise periodicity in each of 1st to 3rd columns is 4.

With k-means clustering, one data (subsequence) is classified into one cluster and one element out of 3-elements in the same row in the incidence matrix A takes a value of 1.

FIG. 11C corresponds to the incidence matrix A of FIG. 11B and illustrates transition of events of the subsequences. In FIG. 11C a horizontal axis indicates the cluster number and a vertical axis indicates a feature value. Here, an event number corresponds to a cluster number. The 1st and 2nd subsequences are both clustered into the cluster #1 (event #1), 3rd subsequence is clustered into the cluster #3 (event #3), and 4th subsequence is clustered into the cluster #2 (event #2). When it is assumed that the feature value in FIG. 11C is a power consumption of an electric appliance, it is possible to correspond the event #1, #2, and #3 with high power, low power and middle (normal) power operations of the electric appliance. The electric appliance has an operation cycle consisting of the high power, middle power and low power operations, may be a manufacturing apparatus arranged in a manufacturing line in a factory, though not limited thereto.

The missed event identification unit 143 checks whether or not the event occurs periodically (FIG. 10, Step S33). The missed event identification unit 143 identifies missing of a relevant event, when the element, which is expected to take a value of 1 in the incidence matrix A, takes a value of 0.

In the case of the incidence matrix A of FIG. 11B when an element of [4*(m−1)+1], or [4*(m−1)+2] th-row where m=1, 2, . . . , 3*m<=M) in the 1st column takes a value 0, instead of a value 1, the missed event identification unit 143 may conclude that the corresponding event clustered in the 1st cluster (cluster #1) fails to occur or is missed. In the same manner, when an element of [4*(m−1)+3] or [4*(m−1)+4] th-row in the 2nd or 3rd column takes a value 0, instead of a value 1, the missed event identification unit 143 may conclude that the corresponding event clustered in the 2nd or 3rd cluster fails to occur or is missed. When the missed event identification unit 143 identifies a missing event, the missed event identification unit 143 may notify the missing of event (alert) to the output device 104 (FIG. 10, Step S34). The output device 104 may output an occurrence of missed event on a display or notify alert by sound.

When the columns-wise periodicity calculation unit 142 cannot find periodicity in a column in the incidence matrix A, the missed event identification unit 143 does not perform missed event identification and the post-processing unit 140 may output such message as "No event periodicity found".

In the first example embodiment, the unsupervised clustering is employed, but the present invention is not limited to the unsupervised clustering. The unsupervised clustering can well be replaced by a supervised clustering (semi-supervised clustering) or a supervised classification, such as SVM (support vector machine) or NN (neural network). In the second example embodiment, the supervised classification is employed, though not limited thereto. The supervised classification uses a set of labeled training data to train a classifier. As a result of the training, the learned classification model is obtained.

Figure 12:
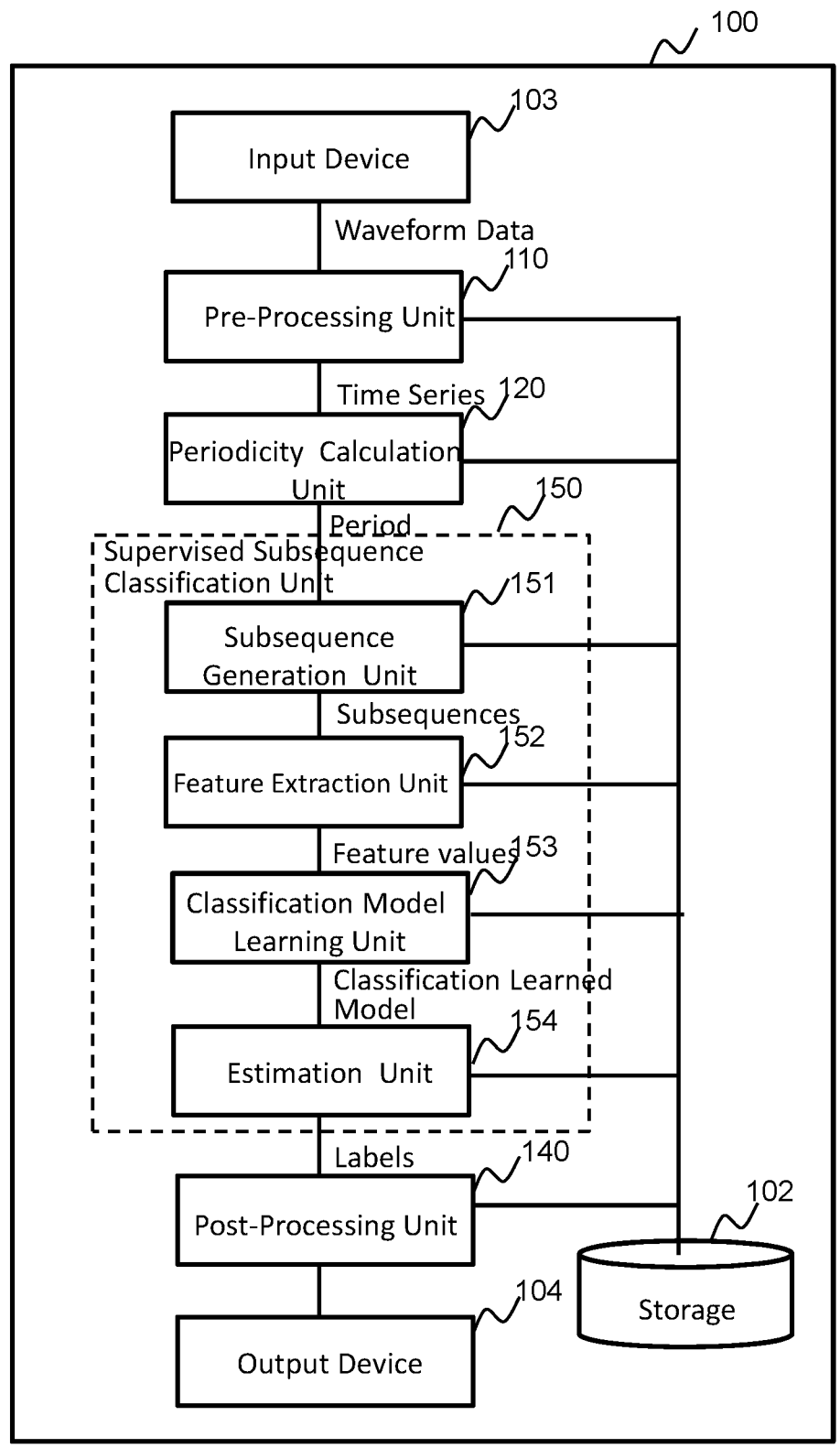
FIG. 12 is a diagram illustrating an arrangement of a second example embodiment.

FIG. 12 illustrates an arrangement of the apparatus 100 of the second example embodiment. Referring to FIG. 12, the subsequence clustering unit 130 in FIG. 1 is replaced by a supervised subsequence classification unit 150. The supervised subsequence classification unit 150 includes a subsequence generation unit 151, a feature extraction unit 152, a classification model learning unit 153 and an estimation unit 154. The subsequence generation unit 151 and the feature extraction unit 152 are the same as the subsequence generation unit 131 and the feature extraction unit 132 of the subsequence clustering unit 130 of the first example embodiment.

The classification model learning unit 153 uses set of labeled training data (features of the subsequences) to obtain a learned classification model. The learned classification model is stored in the storage 102.

The estimation unit 154 uses a learned classification model to estimate (predict) classification of features of the subsequences extracted via a sliding window from the time series data to be analyzed. The estimation unit 154 may output labels as a classification result of the subsequences to the post-processing unit 140. The post-processing unit 140 may perform missing-event detection by using periodicity analysis of subsequences belonging to the same group (sharing the same output label), as described with reference to FIGS. 9 to 11. In this case, the post-processing unit 140 creates an incidence matrix, using labels output by the estimation unit 154. Labeling of each column of the incidence matrix A may be done by incidence matrix creation unit 141, that is, each column of the incidence matrix A may be identified by the label, such as label1, label2, and label3, corresponding to columns 1, 2 and 3, respectively. The operation of the column-wise periodicity calculation unit 142 and missed event identification unit 143 in the post-processing unit 140 are the same as those of the first example embodiment and the description thereof is omitted.

Figure 13:
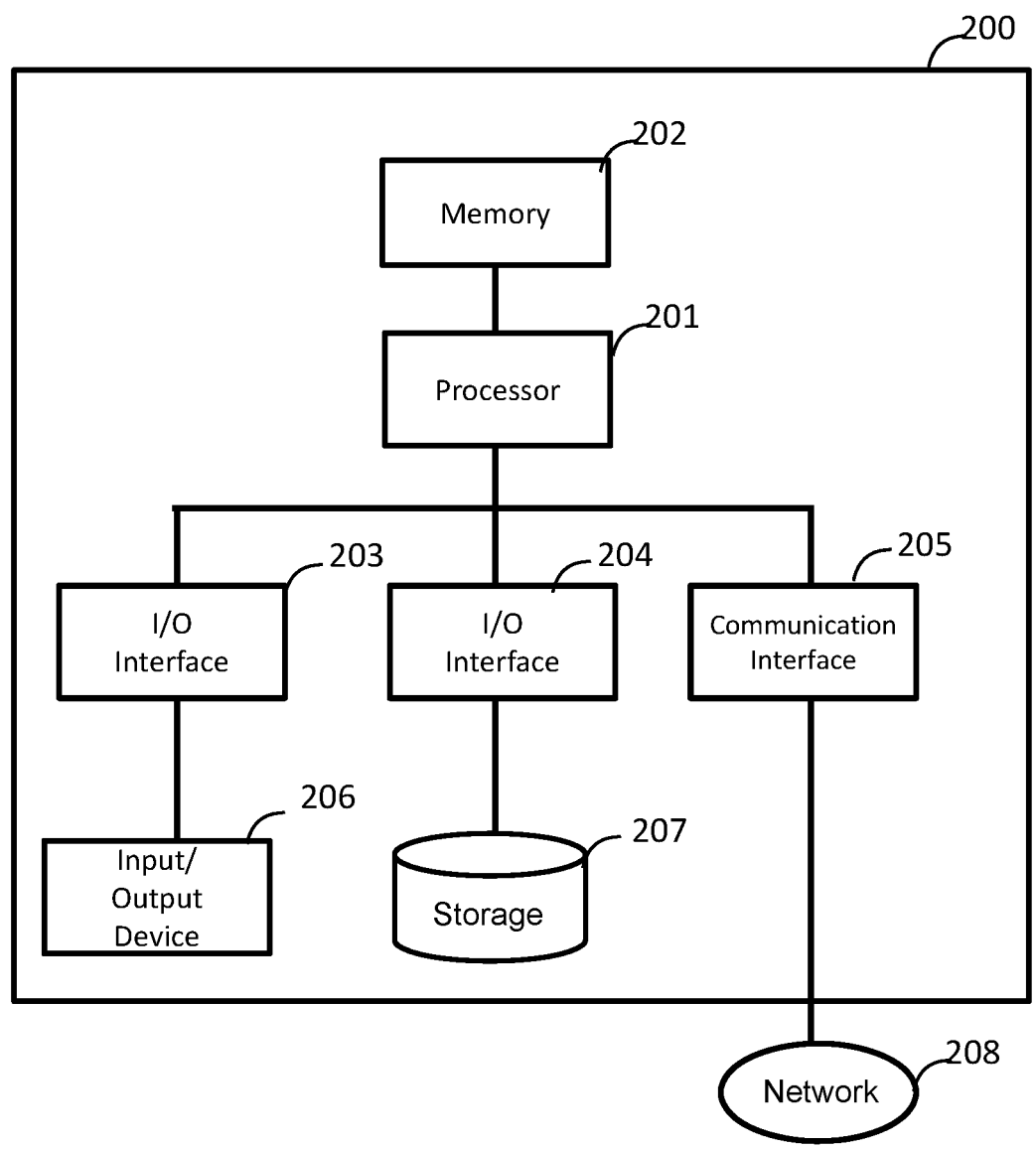
FIG. 13 is a diagram illustrating an arrangement of a third example embodiment.

The periodicity analysis apparatus 100 (or system) described in the above example embodiments may be implemented on a computer system such as a server system (or a cloud system), as illustrated in FIG. 13, for example. Referring to FIG. 13, a computer system 200, such as a server system, includes a processor (Central Processing Unit) 201, a memory 202 that may include, for example, a semiconductor memory (for example, Random Access Memory (RAM), Read Only Memory (ROM), Electrically Erasable and Programmable ROM (EEPROM), and/or a storage device including at least one of Hard Disk Drive (HDD), Compact Disc (CD), Digital Versatile Disc (DVD) and so forth, I/O interfaces 203 and 204, a communication interface 205, an input/output device 206 (display terminal) which is connected to the processor 201 via the I/O interfaces 203, and a storage apparatus 207 which is connected to the processor 201 via the I/O interfaces 204.

The computer system 200 can connect to a network 208 such as LAN (Local Area Network) and/or WAN (Wide Area Network) via the communication interface 205 that may include one or more network interface controllers (NICs). A program for executing the process of the periodicity analysis apparatus 100 in FIG. 1 or FIG. 12 is stored in a storage 207 and the processor 201 reads the program into a main memory provided in the memory 202, from the storage 207 to execute the program to realize the periodicity analysis function according to the above described example embodiments.

The disclosure of the aforementioned PTLs 1-3 and NPTL 1 is incorporated by reference herein. The particular example embodiments or examples may be modified or adjusted within the scope of the entire disclosure of the present invention, inclusive of claims, based on the fundamental technical concept of the invention. In addition, a variety of combinations or selections of elements disclosed herein may be used within the concept of the claims. That is, the present invention may encompass a wide variety of modifications or corrections that may occur to those skilled in the art in accordance with the entire disclosure of the present invention, inclusive of claims and the technical concept of the present invention.

What is claimed is:

1. A periodicity analysis apparatus comprising:
a storage configured to store time series data;
a processor; and
a memory in circuit communication with the processor, wherein the processor is configured to execute program instructions stored in the memory to:
calculate a periodicity of the time series data;
generate a plurality of subsequences, from the time series data, a length of each subsequence set to the periodicity, calculate feature values of the plurality of subsequences,
learn a classification model using training subsequences with the periodicity;
categorize the plurality of subsequences, based on the features values thereof, into one or more groups, by estimating, using the classification model, the group into which the subsequence is classified, based on the feature value thereof;
execute analysis of the time series data, based on the categorization result, and
calculate the periodicity of the times series data, using at least one of a periodogram of the time series data and an autocorrelation of the time series data.

2. The periodicity analysis apparatus according to claim 1, wherein the processor is configured to execute the program instructions stored in the memory to:
find a periodicity of the subsequences belonging to a same group, based on an occurrence order of the subsequences belonging to the same group to identify the subsequence, occurrence of which violates the periodicity of the subsequences belonging to the same group.

3. The periodicity analysis apparatus according to claim 2, wherein the processor is configured to execute the program instructions stored in the memory to:
create an incidence matrix, each element thereof defining relation of the subsequence in a row with each group in a column to take a value 1 if the subsequence is categorized in the group, else take value 0;
calculate a periodicity of occurrence of the value 1 in each column of the incidence matrix; and
identify a missed event when an element of the incidence matrix that is expected to take a value 1 according to the periodicity of the value 1 in the column that the element belongs, takes a value 0.

4. The periodicity analysis apparatus according to claim 1, wherein the processor is configured to execute the program instructions stored in the memory to:
find a maximum peak in the periodogram, and
detect, in the autocorrelation, one or more peaks which occur at one or more lags neighboring to a time corresponding to a frequency of the maximum peak in the periodogram to select the lag as the periodicity, based on a distance between the lag corresponding to the peak and the time corresponding to the frequency of the maximum peak in the periodogram.

5. The periodicity analysis apparatus according to claim 1, wherein the processor is configured to execute the program instructions stored in the memory to:
perform clustering of the plurality of subsequences, based on the feature values thereof, into one or more groups.

6. A computer-based periodicity analysis method comprising:
calculating a periodicity of time series data;
extracting a plurality of subsequences, each having a length set to the periodicity, from the time series data;
learning a classification model using training subsequences with the periodicity;
categorizing the plurality of subsequence, based on feature values of the plurality of subsequences, into one or more groups, by estimating, using the classification model, the group into which the subsequence is classified, based on the feature value thereof;
executing post-processing of the time series data, based on the categorization result; and
calculating the periodicity of the times series data, using at least one of a periodogram of the time series data and an autocorrelation of the time series data.

7. The computer-based periodicity analysis method according to claim 6, further comprising:
finding a maximum peak in the periodogram;
detecting, in the autocorrelation, one or more peaks which occur at one or more lags neighboring to a time corresponding to a frequency of the maximum peak in the periodogram; and
selecting the lag as the periodicity, based on a distance between the lag corresponding to the peak and the time corresponding to the frequency of the maximum peak in the periodogram.

8. The computer-based periodicity analysis method according to claim 6, further comprising:
performing clustering of the plurality of subsequences, based on the feature values thereof, into one or more groups.

9. The computer-based periodicity analysis method according to claim 6, further comprising:
finding a periodicity of the subsequences belonging to a same group, based on an occurrence order of the subsequences belonging to the same group to identify the subsequence, occurrence of which violates the periodicity of the subsequences belonging to the same group.

10. The computer-based periodicity analysis method according to claim 6, further comprising:
creating an incidence matrix, each element thereof defining relation of the subsequence in a row with each group in a column to take a value 1 if the subsequence is categorized in the group, else take value 0;
calculating a periodicity of occurrence of the value 1 in each column of the incidence matrix; and
identifying a missed event when an element of the incidence matrix that is expected to take a value 1 according to the periodicity of the value 1 in the column that the element belongs, takes a value 0.

11. A non-transitory computer-readable recording medium storing therein a program causing a computer to execute processing comprising:
calculating a periodicity of time series data;
extracting a plurality of subsequences, each having a length set to the periodicity, from the time series data;
learning a classification model using training subsequences with the periodicity;
categorizing the plurality of subsequence, based on feature values of the plurality of subsequences, into one or more groups, by estimating, using the classification model, the group into which the subsequence is classified, based on the feature value thereof;
executing post-processing of the time series data, based on the categorization result; and
calculating the periodicity of the times series data, using at least one of a periodogram of the time series data and an autocorrelation of the time series data.

12. The non-transitory computer-readable recording medium according to claim 11, further comprising:
finding a maximum peak in the periodogram;
detecting, in the autocorrelation, one or more peaks which occur at one or more lags neighboring to a time corresponding to a frequency of the maximum peak in the periodogram; and
selecting the lag as the periodicity, based on a distance between the lag corresponding to the peak and the time corresponding to the frequency of the maximum peak in the periodogram.

13. The non-transitory computer-readable recording medium according to claim 11, further comprising:
performing clustering of the plurality of subsequences, based on the feature values thereof, into one or more groups.

14. The non-transitory computer-readable recording medium according to claim 11, further comprising:
creating an incidence matrix, each element thereof defining relation of the subsequence in a row with each group in a column to take a value 1 if the subsequence is categorized in the group, else take value 0;
calculating a periodicity of occurrence of the value 1 in each column of the incidence matrix; and
identifying a missed event when an element of the incidence matrix that is expected to take a value 1 according to the periodicity of the value 1 in the column that the element belongs, takes a value 0.

* * * * *